Aug. 15, 1961
J. S. PAGE ET AL
2,996,074
FLUID PRESSURE ACTUATED SHUT-OFF VALVE
Filed March 1, 1954
2 Sheets-Sheet 1
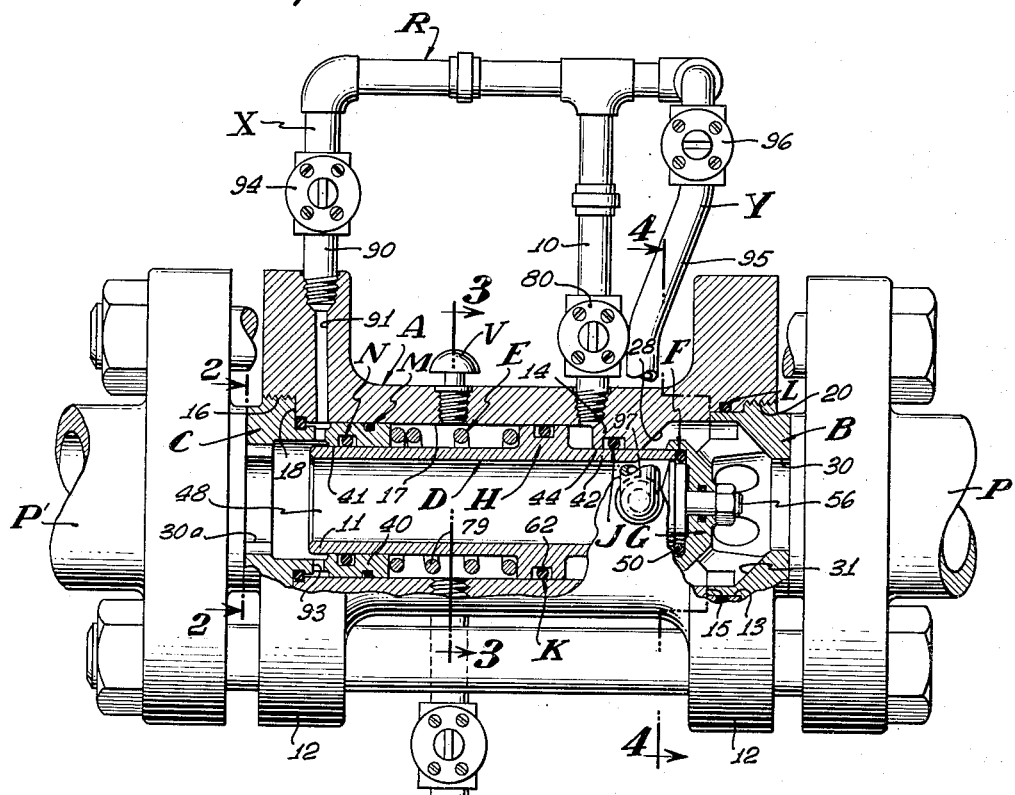
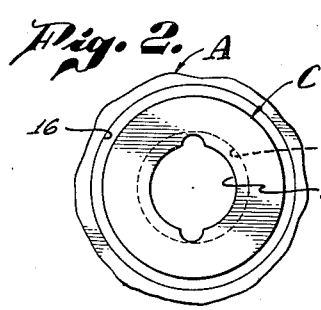
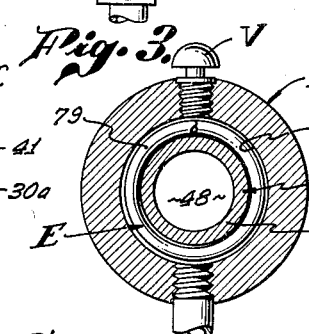
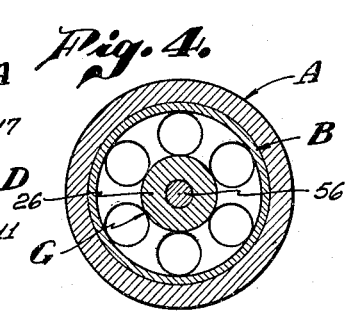
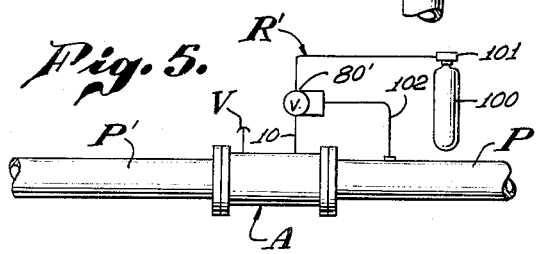
INVENTORS.
JOHN S. PAGE,
JOHN S. PAGE, JR.
AGENT.

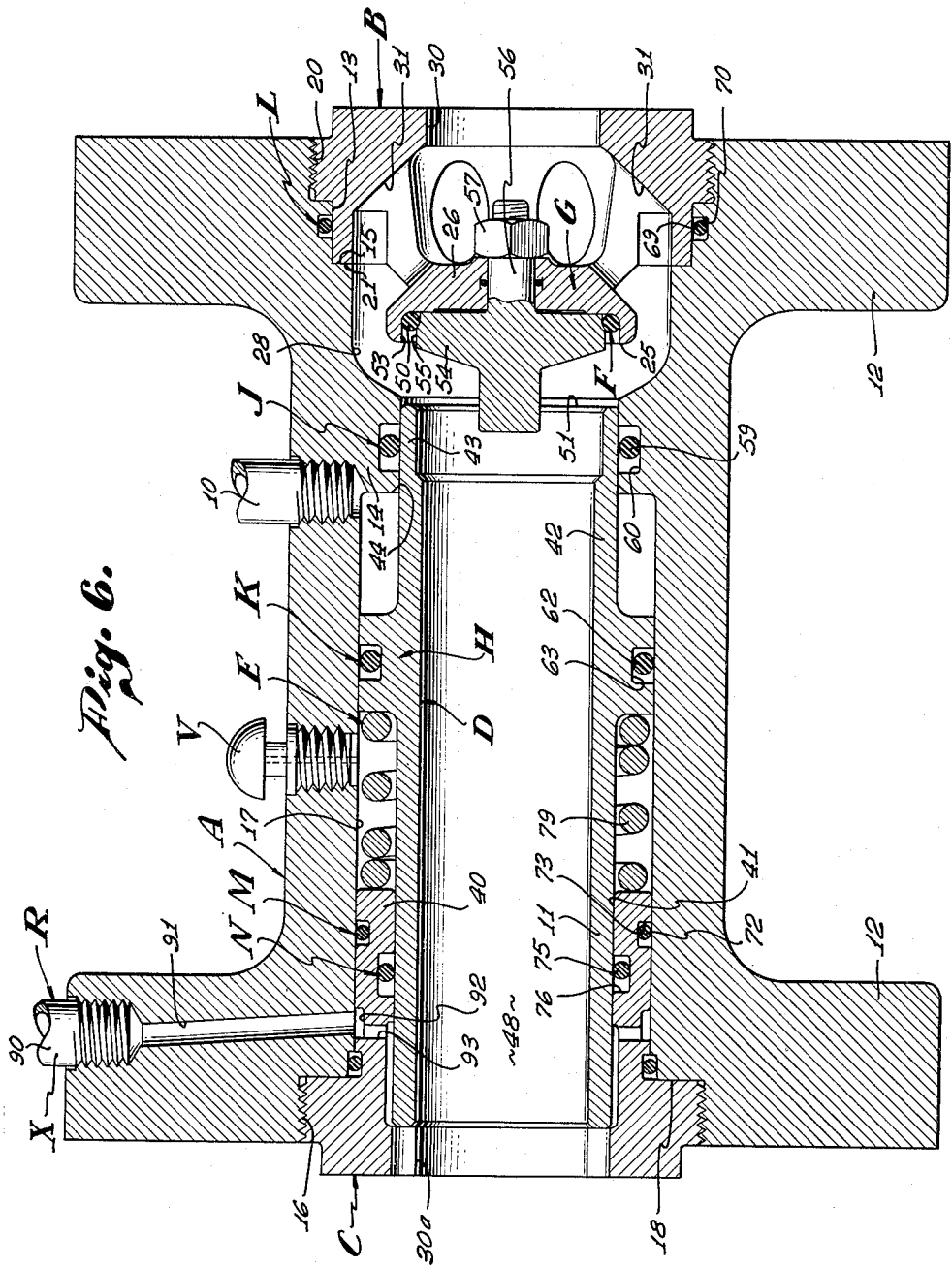

United States Patent Office 2,996,074
Patented Aug. 15, 1961

2,996,074
FLUID PRESSURE ACTUATED SHUT-OFF
VALVE
John S. Page and John S. Page, Jr., both of Box 7126,
Bixby Knolls Station, Long Beach, Calif.
Filed Mar. 1, 1954, Ser. No. 413,076
2 Claims. (Cl. 137—220)

This invention has to do with a fluid pressure actuated shut-off valve and it is a general object of the invention to provide a simple, practical, improved valve construction that is simple and inexpensive of manufacture and which can be used to advantage to control flow through a fluid line.

A general object of the present invention is to provide a valve mechanism wherein the valve element proper reciprocates and is such as to be operated away from its seat by a source of fluid pressure or the fluid pressure handled or controlled by the valve, regardless of the direction in which pressure is applied to the valve. With the construction provided by the present invention the valve, when closed, is held in that position by mechanical spring pressure and/or fluid pressure derived either from the fluid being controlled or from any suitable source.

It is an object of this invention to provide a valve structure of the character referred to which opens when fluid under pressure is introduced into the flow line. That is, when fluid under pressure is admitted to the flow line the valve opens under the influence of the fluid that is controlled by the structure.

Another object of the present invention is to provide a valve mechanism of the general character referred to which is characterized by a shiftable unit slidably carried within a case, which unit is balanced and is of simple tubular formation.

An object of this invention is to provide a fluid handling structure of the character referred to which is operative to shut off the flow of fluid and is such that it can be reversed end for end without rendering it inoperative.

Another object of this invention is to provide a valve structure for the protection of a flow line to close the line in case of pressure failure, which is of simple compact form suitable for incorporation in a pipe line, or the like, between the ends of aligned pipe sections. With the structure provided by the invention the mechanism can be made compact, so that it can be advantageously incorporated in a pipe line to close the line in case of a pressure drop or a break in the line.

It is another object of this invention to provide a valve mechanism of the general character referred to which is of simple, practical, inexpensive construction, the entire mechanism being characterized by round or tubular elements which are of such form and proportioning as to be strong and compact and which are such that they can be readily manufactured in quantities and at a minimum of cost.

The mechanism as provided by the present invention is characterized by an elongate case which is tubular in form with coupling parts in the form of flanges at its ends. A bore enters the body from one end and terminates at a flange occurring intermediate the ends of the body. A stepped bore enters the body from the other end and has an inner portion that serves as a cylinder. A seat closure is provided at one end of the body and is secured thereto, preferably by a threaded connection. A seat is provided on the inner end of the closure and is spaced from the bore. The seat closure serves to pass fluid to or from the interior of the body and may have a central longitudinal opening communicating with lateral ports in the base of the seat portion. A head closure is provided at the other end of the body where it is secured, as by threads, and it has an inner end portion bored to form a valve guide. The head closure serves to pass fluid and may have a central passage communicating with the portion that forms the valve guide.

In accordance with the invention the several elements thus far referred to are normally assembled into a rigid unit or assembly, and in a typical installation pipe sections, or the like, are joined to the closure so that the assembly is rigidly joined or connected in alignment with the pipe sections. The valve of the structure operates in the body and has a forward end portion that opposes the seat and which is slidably guided in the flange in the body. A piston is provided on the exterior of the valve and slides in the cylinder of the body while the rearmost end of the valve operates in the guide opening provided in the head closure. The end of the valve is provided with an annular portion which enters an annular channel formed in the seat, and when the valve is closed the annular portion engages and seals with a sealing ring carried in the channel.

In accordance with the present invention the diameters of the ends of the valve element are alike so that the valve is balanced and will open under the influence of pressure introduced against the piston on the valve element, or will close under the influence of pressure created by a valve closing spring.

The valve mechanism as above described is further provided with fluid connections whereby fluid from a suitable source or from a pipe line connected with the valve may be introduced to move the valve to an open position and hold it in that position until pressure in the pipe line drops, or until it is desired to close the valve, which operation is effected by bleeding of pressure from the valve cylinder so that the spring pressure on the piston of the valve causes it to close.

The various objects and features of our invention will be fully understood from the following detailed description of a typical preferred form and application of the invention, throughout which description reference is made to the accompanying drawings, in which:

FIG. 1 is a longitudinal view of the structure that we have provided, certain of the parts being shown in section to illustrate details of construction, and the valve being shown in the closed position. FIG. 2 is an end view of a portion of the structure taken as indicated by line 2—2 on FIG. 1. FIG. 3 is a transverse sectional view taken through the body of the structure as indicated by line 3—3 on FIG. 1. FIG. 4 is a transverse sectional view taken substantially as indicated by line 4—4 on FIG. 1. FIG. 5 is a diagrammatic view of the structure that we have provided, showing a modified form of application thereof, and FIG. 6 is an enlarged detailed sectional view of the structure removed from the pipe lines and showing the valve in the open position.

The structure embodying the present invention involves, generally, a case made up of a body A, a seat closure B, a head closure C and a valve D. A valve closing means E operates in the body and a sealing means F operates between the valve and a seat G carried by closure B. A piston portion H provided on the valve D operates in a cylinder opening in the body A and a fluid connection 10 is provided for the supply of operating fluid to the body so that it acts on the piston to move the valve to an open position. A sealing means J is provided between the valve and the body A. Sealing means K is provided between the valve and the body to prevent leakage past the piston H. A sealing means L is provided between the seat closure B and the body. A sealing means M is provided between the head closure C and the body and a sealing means N is provided between the head closure C and the rear end 11 of the valve D. A suitable fluid supply means R is provided to supply operating fluid to the connection 10.

The body A is an elongate tubular part which may, in practice, be designed so that it is of standard size and dimensions, that is, so that it is the same as fittings such as are ordinarily employed in connection with pipes P and P′ in connection with which the structure may be employed. Further, the body may, in practice, be formed and constructed so that it is substantially uniform in external configuration from one end to the other. In the preferred form of the invention the body is round in cross section, and has suitable coupling flanges 12 at its ends to be connected with the pipe line.

A bore 13 enters the body A from one end, which we will term the forward end for the purpose of distinguishing it from the opposite end which we will refer to as the rear end. The bore 13 extends a substantial distance into the body and terminates at a flange 14. A shoulder 15 is provided in the bore 13 and the flange 14 projects radially inward at a point intermediate the ends of the body.

A stepped bore enters the body from the other or rear end and it has an outer threaded portion 16 somewhat larger in diameter than its inner portion 17 which is of substantial length and cylindrical in form to provide a cylinder in the body to accommodate piston H. A shoulder 18 occurs where the outer portion 16 of the bore joins the inner cylinder portion 17.

The closure B provided at the forward end of the body A is referred to as a seat closure in that it carries or supports the seat G so that the seat occurs in the proper position within the body. The closure B is releasably connected to the forward end portion of the body A as by a suitable threaded connection. In the particular case illustrated the bore 13 is threaded at 20 into which the closure B is threaded so that it, in effect, plugs the end of the body. With the particular case illustrated an inner face 21 on the closure seats against the shoulder 15 to determine the extent to which the closure can be threaded into the body.

The seat G is carried by the closure B at the inner end thereof and projects from the closure into the interior of the body to terminate at a seat face 25 which is annular in form, concentric in the body A, and which opposes the forward end of the valve D. The base portion 26 of the seat is joined to or is integral with the closure B, and in the preferred form of the invention the entire seat is smaller in diameter than the closure B so that an annular passage 28 occurs between the exterior of the seat and the interior of the body A.

In a preferred form of the invention the closure B is employed to pass fluid either to or from the interior of the body, and in a preferred arrangement a central longitudinal flow handling passage 30 is provided through the closure B and is in communication with lateral ports 31 which connect with the passageway 28 as clearly shown throughout the drawings. In practice, the closure B has a forward face which may be joined with a suitable pipe P, or the like. It is to be understood that any suitable form of connection can be provided between the pipe and the closure.

The head closure C is provided at the rear end of the body A and is secured thereto by a threaded connection. In the case illustrated the construction at closure C is substantially the same as that at closure B, that is, the closure C is in the nature of a plug threaded portion 16 of the bore. In the case illustrated the closure C is adapted to pass fluid and for this purpose has a central fluid passage 30ᵃ and the pipe P′ shown connected to closure C is shown connected to the flange 12 at the rear end of the body A. The inner end portion 40 of closure C is provided with a bore 41 forming a guide for the rear end 11 of the valve D. The bore 30ᵃ is of smaller diameter than the end of the valve D and a shoulder surrounding the bore 30ᵃ acts as a stop therefor. As clearly illustrated in FIGS. 2 and 6 of the drawings, suitable spanner wrench openings are provided in the bore 30ᵃ, which openings insure the flow of fluid to the passage 91, channel 92 and ports 93 hereinafter described.

The valve D provided in the present structure is an elongate tubular element located centrally in the body A where it is confined between the closures B and C with a forward end 42 slidably supported in a guide opening or bore 44 formed through the flange 14 in the body A. The rear end 11 of the valve is slidably engaged in the guide opening 41 provided in the closure C. The valve D being tubular has a passage 48 extending through it from one end to the other, which passage may be uniform in size and shape throughout its length and is substantially the same size as the passage 30ᵃ provided in the closure C.

The valve closing means E embodied in the present invention operates in the body between the closure C and the piston H. As shown, the means E involves a simple helical compression spring 79 that abuts against the inner end of the closure C and yieldingly operates against the rearward side of the piston H. The valve element D is slidably carried in the body A and when the pressure is relieved from the forward side of the piston H the spring 79 operates against the piston H to move the valve D to a closed position as shown in FIG. 1 of the drawings. When fluid pressure occurs in the pipe line P and P′, and when that pressure is directed to the cylindrical bore 17 ahead of the piston H, the fluid pressure acts to force the piston H rearwardly against the pressure of the spring 79 to open the valve as shown in FIG. 6 of the drawings. The spring 79 is a compression spring and is carried in the annular cavity formed between the valve D and the portion 17 of the bore in the body A.

The sealing means F serves to seal between the forward end portion of the valve D and the seat G and in accordance with the preferred form of the invention it involves, an annular sealing ring 50 located at the bottom of a deep annular channel provided concentrically in the face 25 of the seat, and the annular forward end portion 43 of the end 42 of the valve. The end portion 43 has a sealing face 51 and enters the channel in the seat and engages and seals with the ring 50. In the preferred form of the invention the annular sealing ring 50 is round in cross-sectional configuration and the construction that we have provided is such that the ring can be confined in an enlargement at the bottom of the channel and yet be of such formation as to be substantially rigid or permanent as to form. In accordance with our construction we provide a socket opening in the seat G from the face end thereof to establish the outer wall 53 of the annular channel that carries the ring 50, and we provide an insert 54 in the socket with the periphery of the insert forming the inner wall 55 of the channel. A stem 56 projects forwardly from the insert 54 and is releasably secured to the portion of the seat in which the socket is formed, as by a nut 57.

In accordance with the present invention the annular channel provided in the seat for reception of the end portion 43 is of substantial depth, as shown throughout the drawings, and the channel and end portion 43 are related to fit so that as the valve closes fluid trapped in the channel by entrance of the end portion into the channel escapes from the channel past the end portion allowing the end portion to finally engage the sealing ring 50. By suitably relating or proportioning the parts the action just referred to can be such as to suitably cushion or check the closing movement of the valve. In other words, the structure provides a movement retarding means that prevents hammering of the valve such as might otherwise occur.

The sealing means J provided between the forward end 42 of the valve D and the bore 44 in the body involves an annular sealing ring 59 carried in a recess 60 provided in the bore 44. The sealing ring 59 is a continuous annular member that can be engaged in the recess 60 as the valve is assembled into the body.

The sealing means K provided between the piston H and the bore 17 in the body involves an annular sealing ring 62 engaged in an annular recess 63 in the periphery of the piston H. The sealing ring 62 is a continuous annular member and is confined in the recess with its outer periphery exposed to have sealing engagement with the wall of the cylinder opening 17.

The sealing means L occurs between the closure B and the body A and includes a continuous annular sealing ring 69 carried in a recess 70 provided at the inner end of the bore 13 in the body. The sealing ring 69 provides sealing engagement between the inner end of the closure B and the bore 13 of the body.

The sealing means M acts between the head closure C and the body A and may involve a continuous annular sealing ring 72 carried in a recess 73 provided in the periphery of the closure C. The ring 72 is a continuous annular part that provides sealing engagement between the closure C and the body A.

The sealing means N occurs between the closure C and the end 11 of the valve. The means N includes a continuous annular sealing ring 75 carried in a recess 76 provided in the inner bore 41 of closure portion 40. The inner periphery of the ring has sealing engagement with the exterior of the valve part 11, and the ring 75, like the other sealing rings of the structure, can be arranged in place to be confined as the parts are assembled.

In accordance with the present invention the outside diameters of the forward and rear ends of the valve E are the same, and as a result of this relationship of parts the valve D is balanced and will not be influenced by fluid pressure within the flow passages through the structure. When the structure is in a normal or unactuated position the valve is yieldingly held closed by pressure of the means E acting on the piston H.

The pressure supply means R supplies pressure to the structure to effect movement of the valve to the open or actuated position and may be employed to hold the valve in that position so long as pressure exists in either the pipe line P or P'. As shown in FIG. 1, the portion of the body cylinder 17 between piston H and closure C is maintained open to atmosphere through a suitable vent V and the operating fluid or pressure is introduced into the structure through the connection 10 to act between flange 14 and the piston H. So far as the broader aspects of the present invention are concerned operating pressure required to open the valve against forces tending to close it may be derived from any suitable source and may be introduced through the connection 10 under control of a suitable valve 80, or the like. In FIG. 1 of the drawings we have shown a pressure connection X from the rear end of the structure in communication with the fluid pressure in pipe P' to connection 10, and a pressure connection Y from pipe P to connection 10, either one or both of which can be incorporated in the structure as circumstances require.

The connection X involves a pressure supply line 90 extending from a fluid passage 91 which communicates with the fluid pressure in line P' by means of an annular channel 92 and radial ports 93 provided in the closure C. The channel registers with the passage 91 and the ports 93 are in communication with the fluid pressure in the bore 30ᵃ through the spanner wrench openings in the closure C. The connection X also involves a control valve 94 in the line 90 for controlling flow from pipe P' to cylindrical bore 17.

The connection Y may be substantially the same as that just described except that it provides a pressure supply line 95 from the pipe P end of the structure to the connection 10 and is under control of a valve 96 which may correspond with valve 94, above described. As illustrated in FIG. 1, the line 95 receives fluid pressure through a pipe fitting 97 that communicates with the passageway 28 at the forward end of the structure.

From the foregoing description it will be apparent that if the structure is to be employed to control pressure from pipe P' only, the connection X is all that is required. In this case the failure of line pressure from pipe P' will allow closing the valve D by the means E. Line pressure admitted through the connections X and 10 will open the valve and hold it in that position until pressure fails.

If it is desired to employ the structure so that pressure is supplied through pipe P then connection Y can be used. Should the structure be required in a situation where the direction of flow or of pressure control varies at different times, then both the connections X and Y may be employed and the desired action of the structure gained by suitable operation of valves 94 and 96.

In the application of the structure we have provided as shown in FIG. 5 of the drawings, an external pressure supply means R' is provided. This form of the invention involves a reservoir 100 that stores fluid under pressure, and a control valve 80' in the line 10 responsive to fluid pressure in the pipe line P or P'. The reservoir may be provided with a suitable pressure regulator 101, and the controlling elements of the valve 80' may be connected to the pipe line through a fluid connection 102. The valve 80' may be adjustable to hold the valve D open at any desired pressure in the lines P or P', as the case may be. With this external supply means R' the valve D can be held open only when high pressures occur in the pipe line, or the valve D can be held open only when low pressures occur in the pipe line by selecting a valve 80' of the desired type.

From the foregoing description it is important to observe that the failure of line pressure handled by the structure, whether it be from pipe P or from pipe P', serves to allow the valve to close and consequently, the valve is, in effect, such that it can be installed in a pipe line where flow might occur in either direction. Furthermore, it is important to observe that the various parts of the structure are, in effect, round or turned parts, such as can be readily manufactured from tubular stock, and in a manner to be of maximum strength, and thus assure a compact, practical, inexpensive structure.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. A flow control valve comprising: a body having a bore therethrough; axially spaced annular guide members carried by said body and projecting into said bore; a tubular valve element reciprocably disposed in said guide members; said members, said tubular element and said body defining an annular pressure chamber therebetween; an annular piston on said tubular valve element disposed in said chamber; an annular valve seat carried by said body at one end of said tubular valve element; said body having a flow path leading from said bore past said seat; means at one side of said piston for urging said tubular valve element into engagement with said seat; said body having a port leading to said pressure chamber at the opposite side of said piston from said last mentioned means for supplying fluid pressure for urging said tubular valve element away from said seat; one of said annular guide members including a cylindrical portion having a flow passage extending radially therethrough from said bore; means sealing said cylindrical portion to said body at axially spaced points at opposite sides of said radial passage; said body having a portion provided with a passage adapted to be interconnected by a conduit to said port;

and one of said portions having a channel interposed between the passages aforesaid.

2. A flow control valve comprising: a body having a bore therethrough; axially spaced annular guide members carried by said body and projecting into said bore; a tubular valve element reciprocably disposed in said guide members; said members, said tubular element and said body defining an annular pressure chamber therebetween; an annular piston on said tubular valve element disposed in said chamber; an annular valve seat carried by said body at one end of said tubular valve element; said body having a flow path leading from said bore past said seat; means at one side of said piston for urging said tubular valve element into engagement with said seat; said body having a port leading to said pressure chamber at the opposite side of said piston from said last mentioned means to admit fluid pressure to said pressure chamber for urging said tubular valve element away from said seat; one of said annular guide members including a cylindrical portion having a flow passage extending radially therethrough from said bore; means sealing said cylindrical portion to said body at axially spaced points at opposite sides of said radial passage; said body having a passage adapted to be connected to a conduit connectable to said port; and said cylindrical portion having a channel interposed between the passages aforesaid.

References Cited in the file of this patent

UNITED STATES PATENTS

| | | |
|---|---|---|
| 319,896 | Fox | June 9, 1885 |
| 614,441 | Burnett | Nov. 22, 1898 |
| 615,881 | McIntosh | Dec. 13, 1898 |
| 694,811 | Whiting | Mar. 4, 1902 |
| 1,755,536 | Chase | Apr. 22, 1930 |
| 1,884,179 | Parks | Oct. 25, 1932 |
| 2,601,989 | Modes | July 1, 1952 |
| 2,679,261 | Otis | May 25, 1954 |
| 2,725,891 | Bourguignon | Dec. 6, 1955 |

FOREIGN PATENTS

| | | |
|---|---|---|
| 850,567 | France | Sept. 18, 1939 |
| 969,077 | France | Dec. 13, 1950 |
| 145,909 | Australia | Mar. 27, 1952 |
| 859,245 | Germany | Dec. 11, 1952 |
| 1,054,190 | France | Oct. 7, 1953 |